July 2, 1935. J. V. GIESLER 2,006,691
METHOD AND APPARATUS FOR MANUFACTURING CORRUGATED WALLS
Original Filed June 8, 1928
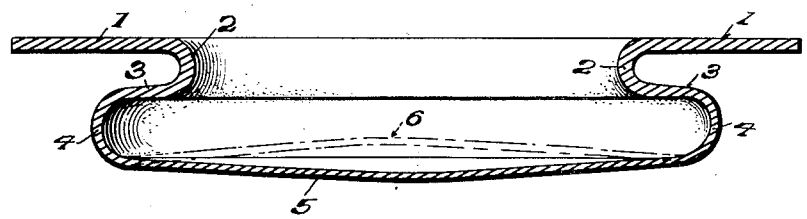
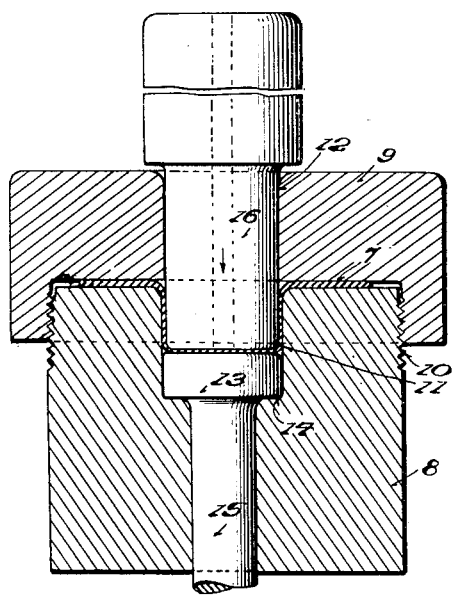
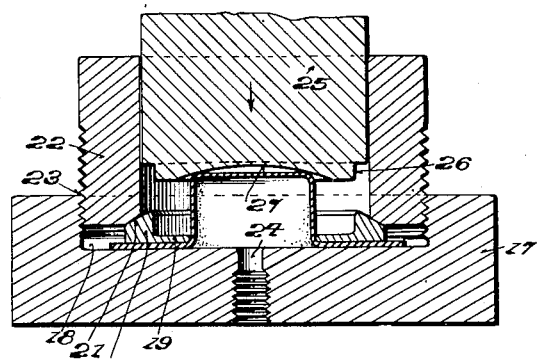
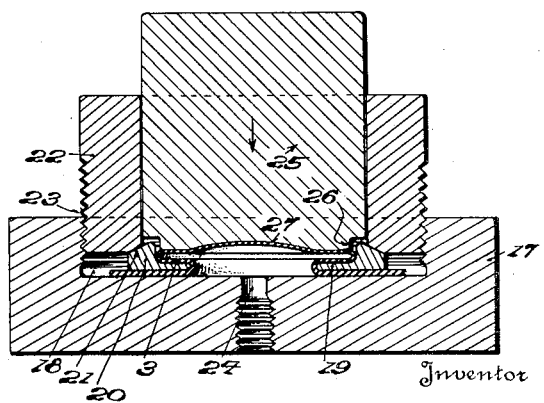
Inventor
Jean V. Giesler.
By
Cameron, Kerkam & Sutton
Attorneys Patented July 2, 1935

2,006,691

UNITED STATES PATENT OFFICE 2,006,691

METHOD AND APPARATUS FOR MANUFACTURING CORRUGATED WALLS

Jean V. Giesler, Knoxville, Tenn., assignor to The Fulton Sylphon Company, Knoxville, Tenn., a corporation of Delaware Original application June 8, 1928, Serial No. 283,970, now Patent No. 1,900,985, dated March 14, 1933. Divided and this application July 16, 1930, Serial No. 468,354

18 Claims. (Cl. 113—44)

This invention relates to expansible and collapsible vessels, and more particularly to a method and apparatus for the manufacture thereof.

Corrugated vessels adapted for use as thermostatic elements, as known to the art, generally comprise tubular corrugated walls having at each end a closing cap or head, thus forming a sealed vessel. The tubular walls are corrugated in a suitable manner, such as by rolling, and the heads are attached to the walls, as by soldering or the like, and such vessels have a considerable range of movement, due to the presence of a plurality of corrugations, which movement is generally proportional to the variations in pressure to which they are subjected. In many instances, however, only a very small expansion and contraction of the vessel is required, and in such cases the corrugated vessel or bellows of the type described involves an unnecessary and economically unsound utilization of material and production cost.

It has been found that a bellows may be constructed with a very small number of corrugations, or even only one complete corrugation, which bellows is not only entirely satisfactory for certain work, but is susceptible of manufacture in a novel form and by a novel process and apparatus which effect considerable economies in production cost in addition to the saving of material involved. Furthermore, owing to its novel construction, such a bellows is capable of a relatively great movement for very small variations in the pressure to which it is subjected, which renders it very sensitive and delicate in responding, for example, to minor variations of temperature or pressure in the surrounding medium. Such a bellows is particularly useful where a desired action is to be initiated at an accurate predetermined temperature.

One of the objects of the present invention is therefore to provide a method and apparatus for manufacturing bellows which will produce bellows having a small number of corrugations and which are very sensitive to small variations in pressure or temperature.

Another object is to provide a method and apparatus for manufacturing bellows which will produce bellows having a relatively large range of movement in response to small variations in temperature or pressure.

A further object is to provide a method and apparatus for manufacturing bellows which will produce an integral, one-piece bellows including a small number of corrugations, a head, and a supporting base or flange.

Another object is to provide a method and apparatus for manufacturing a dished diaphragm capable of buckling between two normal positions and having a novel, radially expanding mounting for the periphery thereof.

Other objects will appear hereinafter as the description of the invention proceeds.

With the above objects in view, a method and apparatus are provided for producing a bellows which comprises an integral, one-piece cup, having a peripheral supporting base or flange at its rim, the bottom of the cup constituting the bellows head, and the wall of the cup having a small number of corrugations to provide for movement of the head relative to the supporting base. In the preferred form, the cup is shallow and has only one complete corrugation in its wall, that is, the wall of the cup adjacent the base is turned outwardly, substantially paralleling said base, and is then turned inwardly to form the bottom of the cup or the movable bellows head. Preferably, also, the said head is dished so that it may occupy either one of two normal positions on either side of an intermediate position. To this end, the corrugation is preferably made sufficiently deep to provide a laterally extending portion of substantial radial extent, permitting the curved wall adjacent the head to expand radially as the head passes through its intermediate position. This arrangement constitutes a radially expanding peripheral mounting for the dished head or diaphragm, with the result that, for any given radial expansion of the diaphragm head, less pressure is required to effect its buckling than would be required if the periphery were rigidly mounted. It follows that for any given pressure acting on the diaphragm head to cause buckling, a greater range of axial movement may be obtained with this mounting, because a greater radial expansion may take place under that pressure and therefore the diaphragm head may be dished deeper.

In the practice of the method of this invention, broadly stated, an integral round blank is first drawn or otherwise formed into a shallow cup having a base flange and a cylindrical wall, the drawing operation being performed in one or more steps depending on the desired depth of the cup, etc. Obviously, the peripheral flange or base may have any desired shape or character, laminated or not, etc., depending on the use for which the bellows is designed. The drawn cup is then placed in a suitable die, and hydrostatic pressure is applied internally thereof while a simultaneous longitudinal pressure is applied to the bottom of the cup. The cup then bulges and flattens, forming corrugations conforming to the shape of a die placed around the wall of the cup. This corrugating operation may be carried out in stages, and the partially completed cup may be annealed between operations. The bottom of the cup may be simultaneously or subsequently dished in any suitable manner. A bellows made in this way has a wall of gradually decreasing thickness from the unworked peripheral flange to the bottom, and having greater resiliency due to the working of the metal involved in its manufacture.

The invention may be better described, by way of example, by reference to the accompanying drawing wherein the practice of the method is set forth in connection with one preferred form of apparatus which may be employed to carry it out. It is to be expressly understood, however, that the drawing is for purposes of illustration only, and is not to be construed as a definition of the limits of the invention, reference being had to the appended claims for this purpose.

In the drawing,

Fig. 1 shows a section of the finished bellows;

Fig. 2 illustrates the first step in the process of forming the bellows; and

Figs 3 and 4 illustrate successive steps in the method of manufacturing the bellows, together with a form of apparatus which may be employed to practice the method.

Referring now to the drawing wherein like reference characters indicate like parts throughout the several views, Fig. 1 shows a complete one-piece bellows, of suitable resilient material such as thin brass, which bellows comprises a supporting base or flange, a diaphragm head, and a corrugated wall connecting the head and the base, the elements being so arranged as to constitute substantially a shallow cup. In the form shown in this figure, the wall of the cup comprises but a single corrugation. The device comprises a peripheral supporting flange or base 1, which base is bent out of its plane at 2 and is curved outwardly to extend substantially parallel to the flange 1 at 3. The portion 3 is in turn bent out of its plane at 4 and is curved inwardly to form the bellows head or diaphragm 5. The diaphragm or head 5 is shown as depressed at its center or dished, so that it occupies either one of two normal positions, one being shown at 5 in full lines and the other in dotted lines indicated by 6. With the diaphragm in either position, if a pressure be applied thereto in the proper direction, the diaphragm may be caused to buckle and to pass from one normal position to the other.

The theoretical explanation of what takes place during this action may not be fully understood, but may be explained as follows. Assuming the diaphragm to be in the position 5, and assuming pressure applied thereto tending to force the center of the diaphragm into an intermediate position, it will be observed that either one or both of two things must happen; either the metal in the center of the diaphragm must be compressed, or the diaphragm must expand radially at its periphery, or both actions may take place. But whether or not both of these actions take place, or whatever may be the true explanation, it is clear that there is a tendency toward radial expansion at the periphery of the diaphragm. It is also clear that if the diaphragm is so mounted that this radial expansion is relatively free and unrestrained, the buckling action of the diaphragm will be greatly facilitated.

In the bellows shown, the periphery of the diaphragm head 5 is relatively free to expand radially, owing to the flexibility of the supporting walls 2, 3 and 4. As pressure is applied to the diaphragm, the bellows first tends to flatten, the portion 3 of the wall being bent about the curved portion 2, and as the pressure gradually increases, the wall 4 tends to expand outwardly and to increase its diameter, thereby allowing the diaphragm to expand radially and move to its intermediate position, whereupon the nature of the stresses set up therein is such that the diaphragm is snapped rapidly to the dotted line position 6. If pressure now be applied to the diaphragm in the position 6, substantially the reverse operation takes place.

The flexible and radially expansible mounting for the diaphragm permits of the latter being dished considerably deeper than would otherwise be practicable, since a given pressure acting on the diaphragm encounters less resistance to radial expansion thereof, and a greater expansion may therefore be provided for. Considerable range of movement for minor variations in pressure is thus provided, since the diaphragm not only flexes but is bodily displaced axially, and snaps to its extreme position when the pressure reaches a predetermined limit. The limiting pressure may be thus very accurately defined within very small limits.

It will be observed that the wall of the bellows gradually decreases in thickness from the flange 1 to the diaphragm head 5. This thinning of the wall is carried out during the manufacture of the bellows, preferably as hereinafter described, and since the decrease in thickness is a measure of the amount of working of the metal, the wall of the completed bellows has a resilience which increases roughly in proportion to the decrease in thickness of said wall. If desired, the progressive decrease in thickness may be carried on throughout the diaphragm head 5.

Referring now to Figs. 2 to 4, inclusive, the practice of the method which has been broadly set forth above is illustrated in connection with one form of apparatus whereby the same may be carried out. The blank from which the bellows is made is preferably a round, flat thin disc of a suitable resilient material, and the first step in the method consists in drawing or otherwise forming a cup-shaped depression in the center portion of the blank. Referring to Fig. 2, this may be accomplished by clamping a flat blank 7 between a die 8 and a clamping ring 9 which is shown as threaded on the die 8 at 10. The die 8 and clamping ring 9 are provided with alined central openings 11 and 12. Movable in the opening 11 of the die is a plunger 13, normally seated on a shoulder 14 formed in the die opening 11, and provided with a rod 15 which may be actuated to displace the blank from the die after the drawing operation is completed. A punch 16 is slidable in the opening 12 of the clamping ring 9 and is arranged to enter the opening 11 in the die 8. When the blank 7 is clamped in position, and the punch 16 is operated, the center portion of the blank is drawn out into a cup-shaped depression as shown in Fig. 2, whereupon the clamping ring 9 is removed and the blank is ejected from the die by means of the plunger 13. Preferably this drawing operation is carried out in steps, each successive step carrying the drawing further to increase the depth of the cup, and stretching out and thinning the wall thereof.

In the practice of the corrugating part of the method, the corrugation of the wall of the cup and the dishing of the bottom thereof are preferably carried out in a single apparatus and operation, Fig. 3 showing the initiation of this operation and Fig. 4 showing its completion. Referring to Fig. 3, a base or support 17 is provided with a well or depression 18 into which the partially completed blank is placed in inverted position, with the flange of the cup resting on the bottom of the well. Suitable means are provided for rigidly clamping the blank in this position, and the corrugation of the wall of the cup is carried out by restricting said wall at desired points and bulging the wall intermediate said points, in order to form the corrugations. In the form of the apparatus shown, adapted to form a single corrugation, the clamping means and the means for restricting the wall of the cup are embodied in a single member, comprising a ring 19, which rests upon and clamps the flange of the blank in place. The inner diameter of the ring 19 is approximately the outer diameter of the wall of the cup, so that the ring 19 serves as a die member on which the wall of the cup may be bulged outwardly to form the desired corrugation. The radial extent of the bulge or corrugation is determined by a raised peripheral portion 20 of the ring 19.

Any suitable means may be employed for securing the ring 19 tightly in position, and in the form shown, the raised portion 20 of the ring has an outwardly and downwardly inclined upper surface 21, which is engaged by a correspondingly inclined surface of a clamping ring 22 threaded into the well 18. Preferably, the ring 19 is made in two or more parts, for convenience in positioning and removing the same, and the inclined cooperating surfaces clamp the ring 19 against movement both radially and upwardly.

In order to accomplish the bulging of the cup, a pressure is applied internally of the cup, and a pressure is applied externally to the bottom thereof, the combined effect of these pressures being to flatten the cup and to bulge the wall outwardly. Preferably, the internally applied pressure is hydrostatic, and in the apparatus shown, a fluid under pressure is admitted to the interior of the cup through an opening 24 in the base 17. The pressure externally applied to the bottom of the cup comprises preferably a mechanical force, and, as shown, is applied by means of a plunger 25 slidable in and guided by the clamping ring 22, and having a projecting end portion of somewhat reduced diameter, adapted to enter within the raised portion 20 of the ring 19 when the plunger is forced inwardly. Preferably, the dishing of the bottom of the cup is obtained in one single operation in the same apparatus, and to this end the face of the end portion of the plunger is concave at 27.

The parts are shown in Fig. 3 in their positions at the initiation of the operation. As the plunger 25 is displaced downwardly, it acts to flatten the cup, and to cause the wall thereof to buckle. The hydrostatic pressure within the cup causes the said wall to buckle outwardly, and to be bent around and to lie closely against the die ring 19 to form the portion 3 of the completed blank, as will be understood from a comparison of Figs. 3 and 4, and causing further stretching and thinning of the wall of the cup. The shoulder 26 on the plunger 25 also cooperates with raised portion 20 of ring 19 to predetermine the approach of the plunger 25 to the ring 19 and thereby determine the axial width of the portion 4 of the completed blank. The hydrostatic pressure likewise acts to bulge the bottom of the cup outwardly into the concave end 27 of the plunger 25 to form the dished bottom of the completed bellows. The operation represented in Figs. 3 and 4 may be carried out in one stage but is preferably carried out in two or more stages, and between the successive stages the partially completed blank may be removed and annealed and replaced in the apparatus for further treatment. The completed bellows thus formed is illustrated in an enlarged view in, and has been described in connection with, Fig. 1.

The bellows which has been described is obviously capable of widely varying applications, and not only possesses the important advantages of a large range of movement for minor variations in temperature and pressure, a snap action and extreme accuracy in operation, but it is also in a form which lends itself readily to commercial quantity production at unusually low costs. Whereas the usual bellows, when employed for certain work, involves not only a needless use of material, but also requires extensive rolling or swaging operations to form the corrugations, the novel bellows of this invention involves a minimum of material and is capable of manufacture by a quick, simple process which results in great economy. Furthermore, whereas the usual form of corrugated bellows is so designed as to require a separate head to be attached to the corrugated wall, the novel bellows of this invention may be made integrally in one piece. Thus again manufacturing economies are effected, and possibilities of leakage are greatly reduced.

While only one form of method and apparatus for manufacturing bellows has been described and illustrated in the drawing, it is to be expressly understood that the invention is capable of various forms of expression and of variation in the form and nature of the steps and apparatus employed. Furthermore, the method of making corrugated bellows hereinbefore set forth is not restricted to the manufacture of the specific bellows shown, but may be extensively practiced in the manufacture of such devices of various forms; and it is likewise to be understood that the apparatus herein disclosed is susceptible of variation in form as well as in details of construction in view of the conditions to be met and the ends to be attained. Reference is therefore to be had to the appended claims for a definition of the limits of the invention.

This application is a division of my application Serial No. 283,970, filed June 8, 1928, for Improvements in vessels having a corrugated wall and method and apparatus for the manufacture thereof.

What is claimed is:

1. The method of making a flexible, expansible and collapsible element which consists in drawing a metal blank into cup shape, and in thereafter simultaneously applying pressure to the inside of the cup and longitudinal compression to the wall thereof while limiting the wall of said cup against expansion at a point intermediate its length, to stretch and thin the lateral wall into a radially and axially flexible mounting for the bottom of said cup and in dishing the bottom wall of said cup.

2. The method of making a flexible, expansible and collapsible element which consists in drawing a metal blank into cup shape, and in thereafter simultaneously applying internal pressure to the wall of said cup and external pressure to the bottom thereof, thereby imparting flexibility to said lateral wall and forming a radially and axially flexible mounting for the bottom of said cup and dishing said bottom.

3. The method of making a flexible, expansible and collapsible element which consists in drawing a metal blank into cup shape, in folding and tapering the lateral wall of said cup by simultaneously applying pressure to the inside of the cup and longitudinal compression to the wall thereof while limiting the wall against expansion along a circumferential line intermediate its length, and in dishing the bottom of said cup.

4. The method of making a flexible, expansible and collapsible element which consists in drawing the center portion of a metal blank into cup shape leaving a peripheral flange, in thereafter simultaneously rendering the lateral wall of said cup flexible and of tapered thickness by applying pressure to the inside of the cup and longitudinal compression to the wall thereof while restricting the wall against expansion adjacent said flange, and in dishing the bottom of said cup.

5. The method of making a flexible, expansible and collapsible element which consists in drawing a metal blank into cup shape leaving a peripheral flange, in folding the lateral wall of said cup and tapering said wall in thickness by simultaneously applying fluid pressure to the inside of said cup and longitudinal compression to the wall thereof to form a single corrugation in said wall, and in dishing the bottom of said cup.

6. The method of making a flexible, expansible and collapsible element which includes the steps of forming a metal cup, and dishing the bottom of the cup while forming an axially and radially yieldable support for the bottom of the cup by subjecting the cup to the combined action of interior pressure and an exterior axially directed pressure.

7. The method of making a flexible, expansible and collapsible element which includes the steps of forming a metal cup, reversely bending the lateral wall of the cup and thereby providing an axially and radially flexible mounting for the bottom of the cup, and dishing the bottom of the cup.

8. The method of making a flexible, expansible and collapsible element which includes the steps of forming a metal cup, and subjecting the cup to hydrostatic pressure and an axial force of compression to reversely bend the lateral wall of the cup into a radially and axially flexible mounting for the bottom of the cup, and dishing the bottom of the cup.

9. The method of making a flexible, expansible and collapsible element which includes the steps of forming a metal cup, subjecting the cup to the combined action of fluid pressure and an axially directed force of compression thereby reducing the thickness of the metal and forming the lateral wall of the cup into at least one relatively deep corrugation forming a radially and axially flexible mounting for the bottom of the cup, and simultaneously deforming the bottom of the cup to dish the same.

10. An apparatus of the character described including in combination a die for clamping a cup-shaped blank and comprising a radially directed portion adapted to engage the lateral wall of said blank, means permitting the introduction of hydrostatic pressure into the interior of said blank, and means for applying a force of compression to the bottom of said blank to fold the lateral wall thereof around the radially directed portion of said die with the aid of hydrostatic pressure applied interiorly of the blank.

11. An apparatus of the character described including in combination a die for clamping a cup-shaped blank and comprising a radially directed portion adapted to engage the lateral wall of said blank, means permitting the introduction of hydrostatic pressure into the interior of said blank, and a plunger having a concaved end surface for dishing the bottom of the blank and simultaneously folding the lateral wall thereof about the radially directed portion of said die with the aid of hydrostatic pressure introduced interiorly of said blank.

12. Apparatus of the class described comprising a base adapted to receive a flanged, cup-shaped blank, a partible die ring, the flange of said blank being clamped between said ring and base, a conduit in said base communicating with the inside of the cup, and a plunger slidable within said ring and engaging the bottom of the cup.

13. Apparatus of the class described comprising a base adapted to receive a flanged, cup-shaped blank, a partible die ring, the flange of said blank being clamped between said die ring and base, a conduit in said base communicating with the inside of the cup, and a plunger slidable within said ring and engaging the bottom of the cup, said plunger having a curved surface.

14. Apparatus of the class described comprising a base adapted to receive a flanged, cup-shaped blank, a partible ring clamping said flange to said base, said ring having a raised peripheral portion, means permitting introduction of hydrostatic pressure to the inside of the cup, and a plunger engaging the bottom of the cup and adapted to enter the raised portion of said ring.

15. Apparatus of the class described comprising a base adapted to receive a flanged, cup-shaped blank, a partible ring clamping said flange to said base, said ring having a raised peripheral portion, means permitting introduction of hydrostatic pressure to the inside of the cup, and a plunger engaging the bottom of the cup and adapted to enter the raised portion of said ring, said plunger having a curved surface.

16. The method of making a flexible, expansible and collapsible element which includes the steps of drawing a cup and corrugating the lateral wall thereof into at least one relatively deep corrugation which tapers in thickness progressively to the bottom of said cup and thereby rendering said lateral wall radially and axially flexible, and dishing the closed end of the cup.

17. The method of making a flexible, expansible and collapsible element which includes the steps of drawing a cup, subjecting the cup to the combined action of fluid pressure and an axially directed force of compression thereby forming the lateral wall of the cup into at least one corrugation the wall of which tapers in thickness from the open to the closed end of the cup, and dishing the bottom of the cup.

18. The method of making a flexible, expansible and collapsible element which includes the steps of drawing a cup, and subjecting the cup to deforming pressure thereby tapering the lateral wall thereof progressively toward the bottom of said cup and also corrugating said lateral wall, and simultaneously dishing the bottom of the cup.

JEAN V. GIESLER.